US008244772B2

(12) United States Patent  (10) Patent No.: US 8,244,772 B2
Aasman et al.  (45) Date of Patent: Aug. 14, 2012

(54) METHOD FOR CREATING A SCALABLE GRAPH DATABASE USING COORDINATE DATA ELEMENTS

(75) Inventors: Jannes Aasman, Moraga, CA (US); Steven M. Haflich, Berkeley, CA (US)

(73) Assignee: Franz, Inc., Oakland, CA (US)

( * ) Notice: Subject to any disclaimer, the term of this patent is extended or adjusted under 35 U.S.C. 154(b) by 930 days.

(21) Appl. No.: 12/102,723

(22) Filed: Apr. 14, 2008

(65) Prior Publication Data

US 2008/0243908 A1    Oct. 2, 2008

Related U.S. Application Data

(63) Continuation-in-part of application No. 11/731,604, filed on Mar. 29, 2007, now Pat. No. 7,890,518.

(51) Int. Cl.
*G06F 17/30* (2006.01)
(52) U.S. Cl. ........................................ 707/797; 707/798
(58) Field of Classification Search ........................ None
See application file for complete search history.

(56) References Cited

U.S. PATENT DOCUMENTS

| 2001/0013035 | A1 | 8/2001 | Cohen |
| 2002/0087953 | A1 | 7/2002 | Hines |
| 2003/0187867 | A1* | 10/2003 | Smartt ........................ 707/102 |
| 2005/0278378 | A1* | 12/2005 | Frank ........................ 707/104.1 |
| 2006/0085465 | A1 | 4/2006 | Nori et al. |

OTHER PUBLICATIONS

Form PCT/ISA/220, "PCT Notification of Transmittal of The International Search Report and the Written Opinion of the International Searching Authority, or the Declaration," 2 pgs.
Form PCT/ISA/210, "PCT International Search Report," 2 pgs.
Form PCT/ISA/237, "PCT Written Opinion of the International Searching Authority," 6 pgs.

* cited by examiner

*Primary Examiner* — Jean B Fleurantin
*Assistant Examiner* — Anteneh Girma
(74) *Attorney, Agent, or Firm* — Dergosits & Noah LLP; Geoffrey T. Staniford

(57) ABSTRACT

Embodiments of a method for creating a graph database which is arranged to store data in the form of graph tuples comprising n-parts, are described. In an embodiment, each tuple-part is encoded into a unique part identifier (UPI). A geospatial UPI is defined for two-dimensional data elements that include a plurality of data points defined by respective pairs of an X-ordinate and a Y-ordinate. A two-dimensional data space is divided into a plurality of uniform Y strips of defined widths. The Y-strip width is selected to correspond approximately to an anticipated Y dimension of a typical search region of interest. The geospatial UPI encodes a plurality of coordinate points in a two-dimensional data space into a single datum that includes respective pairs of an X-ordinate and a Y-ordinate. The geospatial UPI comprises a data structure arranged in order of sort priority by the geospatial UPI type code, geospatial subtype, and Y-strip identifier followed by the X-ordinate data and Y-ordinate data. The component fields of the data structure are arranged so that the datum can be sorted linearly as a single unsigned integer, thus facilitating a search over a two dimensional region of the data by allowing a search process to linearly scan a limited identifiable region of each of the several strips overlapping the search region of interest.

11 Claims, 12 Drawing Sheets

300

| NAMED FIELD 302 | COMPOSITION 304 | TYPE 306 |
|---|---|---|
| SUBJECT | 12 UNSIGNED BYTES | UPI |
| PREDICATE | 12 UNSIGNED BYTES | UPI |
| OBJECT | 12 UNSIGNED BYTES | UPI |
| GRAPH | 12 UNSIGNED BYTES | UPI |
| ID | 8 UNSIGNED BYTES | UNSIGNED LONG |

```
<AdultMaleHuman_Terrorist rdf:ID="AbuAbdullahAbuDijana">
  <rdfs:comment>An Al-Qaida member who, along with Abu Fadal
    al-Makkee, directed al-Fadl to set up meetings in order to
    purchase uranium.</rdfs:comment>
  <guid>5a248a52-3916-11d6-8000-00a0c99cc5ae</guid>
</AdultMaleHuman_Terrorist>
<owl:Class rdf:ID="IraqiPerson_AdultMaleHuman_Terrorist_Leader">
  <rdfs:subClassOf rdf:resource="#IraqiPerson"/>
  <rdfs:subClassOf rdf:resource="#AdultMaleHuman"/>
  <rdfs:subClassOf rdf:resource="#Terrorist"/>
  <rdfs:subClassOf rdf:resource="#Leader"/>
</owl:Class>
<IraqiPerson_AdultMaleHuman_Terrorist_Leader rdf:ID="AbuAyoupAlIraqi">
  <rdfs:comment>Al Qaeda member.  Attended the first Al Qaeda
    formation meeting in Khost, Afghanistan.  Emir of the Al
    Qaeda formation meeting, and originally the emir of Al Qaeda.</rdfs:comment>
  <guid>0356bdfa-37bb-11d6-8000-00a0c99cc5ae</guid>
  <boss rdf:resource="#OsamaBinLaden"/>
  <hasBeenIn rdf:resource="#CityOfJagjiAfghanistan"/>
  <hasBeenIn rdf:resource="#CityOfKhostAfghanistan"/>
</IraqiPerson_AdultMaleHuman_Terrorist_Leader>
<owl:Class rdf:ID="Terrorist_Mullah_MaleHuman">
  <rdfs:subClassOf rdf:resource="#Terrorist"/>
  <rdfs:subClassOf rdf:resource="#Mullah"/>
  <rdfs:subClassOf rdf:resource="#MaleHuman"/>
</owl:Class>
<Terrorist_Mullah_MaleHuman rdf:ID="AbuBakarBashir">
  <rdfs:comment/>
  <guid>003b0ed1-d1c2-11d7-9801-0002b35bb117</guid>
</Terrorist_Mullah_MaleHuman>
```

602

METHOD FOR CREATING A SCALABLE GRAPH DATABASE USING COORDINATE DATA ELEMENTS

CROSS-REFERENCE TO RELATED APPLICATIONS

The current application is a continuation-in-part application of U.S. patent application Ser. No. 11/731,604, filed on Mar. 29, 2007 and entitled "Method for Creating a Scalable Graph Database," which is hereby incorporated by reference in it entirety.

FIELD

Embodiments of the invention relate generally to data processing, and more specifically to creating scalable graph databases using coordinate data elements.

BACKGROUND

Relational databases generally store data in rows and columns. Graph databases represent a significant extension over relational databases by storing data in the form of nodes and arcs, where a node represents an entity or instance, and an arc represents a relationship of some type between any two nodes. Graph database representations allow data modeling that more closely parallels the real world and provides a visual representation of connected data. In general, a graph is a set of objects, called points, nodes, or vertices, which are connected by links, called lines or edges. The edges establish relationships (connections) between the nodes. Graphs can be directed or undirected. In an undirected graph, an edge or line from point A to point B is considered to be the same as a line from point B to point A. In a directed graph (digraph), the two directions are treated as distinct arcs or directed edges.

Graph databases are used in a wide variety of different applications that can be generally categorized into two major types. The first type includes complex knowledge-based systems that have large collections of class descriptions (referred to as "knowledge-based applications"). Knowledge bases in the life sciences or biological modeling are examples of this type of graph-based application. The second type includes applications that involve performing graph searches over transactional data (referred to as "transactional data applications"). Social network analysis, telecommunications services and data mining, enterprise database integration, fraud detection, and telemetry are some examples of this second type of graph-based application. Many applications may actually represent both types of application; however, most applications can be characterized primarily as either knowledge-based or transactional data applications. Governments and other large entities often use graph databases to maintain large so-called "semantic networks" that can store large amounts of structured and unstructured data in various fields, such as biology, security, telecommunications, and so on. A semantic network is often used as a form of knowledge representation. It is a directed graph consisting of vertices that represent concepts, and edges that represent semantic relationships between the concepts.

Typical operations associated with graphs, such as finding a path between two nodes or finding the shortest path from one node to another node are performed by graph algorithms. Graph algorithms are used in many types of data processing applications. One present, known graph database is the Cogito Graph Engine which represents information as entities (nodes) and relationships (arcs) in a scalable store to execute high performance traversal and retrieval operations. The Cogito Graph Engine provides modeling and query services in addition to fundamental graph services. Unlike other systems that use an "in-memory graph," the Cogito Knowledge Center provides a "persistent graph" that spans the size of memory available. Users can model the data to establish various contextual relationships, ontologies and views of the information. Data points are identified as class-typed nodes in the graph overlay, and relationships are represented as arcs with definable arc types. Modeling flexibility allows analysts to change the graph model structure to easily see different perspectives on potential patterns or relationships. Once the data has been imported, modeled, and linked, it can be analyzed based on user queries. Users can query the data to see if relationships exist between seemingly unrelated data points, or identify the shortest path between particular data points, or even try to determine whether specific patterns exist within the data. The data can further be analyzed to reveal which connections are the most powerful or the weakest, how one data point affects other data points, or how information is interrelated.

In general, there are many possible types of graph representations. Graph data may be stored in memory as multidimensional arrays, or as symbols linked to other symbols. Another graph representation are "tuples," which are finite sequences or ordered lists of objects, each of a specified type. A tuple containing n objects is known as an "n-tuple," where n can be any non-negative integer. A tuple of length 2 (a 2-tuple) is commonly called a pair, a 3-tuple is called a triple, a four-tuple is called a quadruple, and so on. Tuples are used to describe mathematical objects that consist of specified parts.

In typical implementations, triples are stored in memory in the form of "triple-stores." The triple-parts (including a unique part identifier and other fields) are all stored as columns in a field, where each field is individually indexed, or indexed on any combination of parts. One disadvantage associated with present methods of storing the triple-parts as strings in tables is that it is very expensive both in terms of storage and in terms of processing overhead, as this method may require many long text string comparisons. Further prior art solutions are known in which every part is replaced by a unique identifier. However, these implementations have several inherent drawbacks, such as: lack of scalability in that at present no triple-store can load well beyond several billions of triples; limited range queries, in that no triple-store using this technique allows for range queries on numeric values; and lack of distributed processing capability, in that the same string would have different identifiers, and other similar disadvantages.

To illustrate the drawbacks associated with present graph database systems, consider an example in which it is desired to store 20 billion triples with 5 billion unique strings where each string has on average 25 unicode characters (~50 bytes). Such a number, while very large, may represent only one month of telephone records in the United States, or all of the people in China, with each person associated with 15 descriptive terms (parts), each part stored in a "slot" of a certain type (e.g., float, integer, etc.). With regard to scalability, for part-to-identifier mapping, the fastest way of interning the strings is to keep the mapping in memory. In this case, a hashtable or a trie (also known as a prefix tree) could be used. However, for 5,000,000,000 unique parts this means that with a simple hash table, a 7,000,000,000 vector on a 64 bit system (=56 Gigabyte) plus the part itself (=250 Gigabyte) plus the link to a unique identifier (requiring two 64 bit integers=80 Gigabyte) would be needed. The total memory requirement would thus be on the order of 386 GB, and this is only for part-to-number mapping. With some clever processing and the use of text tries, this could possibly be reduced to roughly 100 GB, but this is still a great deal of memory in which to store only a single mapping. Although it would be possible to store the part-to-identifier mapping completely on disk in a b-tree (prefix-b-tree, disk-trie, etc.), this means that for large numbers of parts, accessing a mapping becomes ultimately diskbound. This can cause significant processing slowdown, since disk seeks involve computer input/output operations that are typically several orders of magnitude slower than resident memory accesses.

Present graph database systems also present certain drawbacks with regard to sorting and finding two-dimensional data elements in a data space. For one-dimensional indexing, data structures such as B-trees can provide relatively efficient methods for sorting and most one-dimensional data naturally sort in a linear fashion. Two-dimensional data, however, presents a much more complicated challenge. For two-dimensional indexing, several different multi-dimensional indexing algorithms exist. One such algorithm is the R-tree, which defines rectangular regions of space defined by two opposite corners of a rectangle or bounding box (or "minimum bounding rectangles") which encloses the error-circle. The R-tree data structure splits space with hierarchically nested, and possibly overlapping bounding boxes. In many applications, however, the bounding box may contain too many data points to be truly efficient, thus R-trees generally do not give good performance under extreme scaling. Furthermore, some amount of pre-processing is required to determine the size of the bounding box. Thus, even with R-trees, sorting within a two-dimensional space is typically disadvantageous since it requires examining an overly large portion of the index. The R-tree structure, and other similar structures for two-dimensional data elements also do not translate easily into a linear index. Efficient sorting and searching of linear indexes is a problem well understood by computer science. The embodiments described herein exploit this by converting a two-dimensional area search into a manageable number of simple linear searches.

BRIEF DESCRIPTION OF THE DRAWINGS

Embodiments of the present invention are illustrated by way of example and not limitation in the figures of the accompanying drawings, in which like references indicate similar elements and in which:

FIG. 3 illustrates a triple structure under an embodiment.

FIG. 6 is an example of triple structures comprising OWL and RDF classes that can be used with embodiments of a scalable graph database creation process.

SUMMARY

Figure 1:
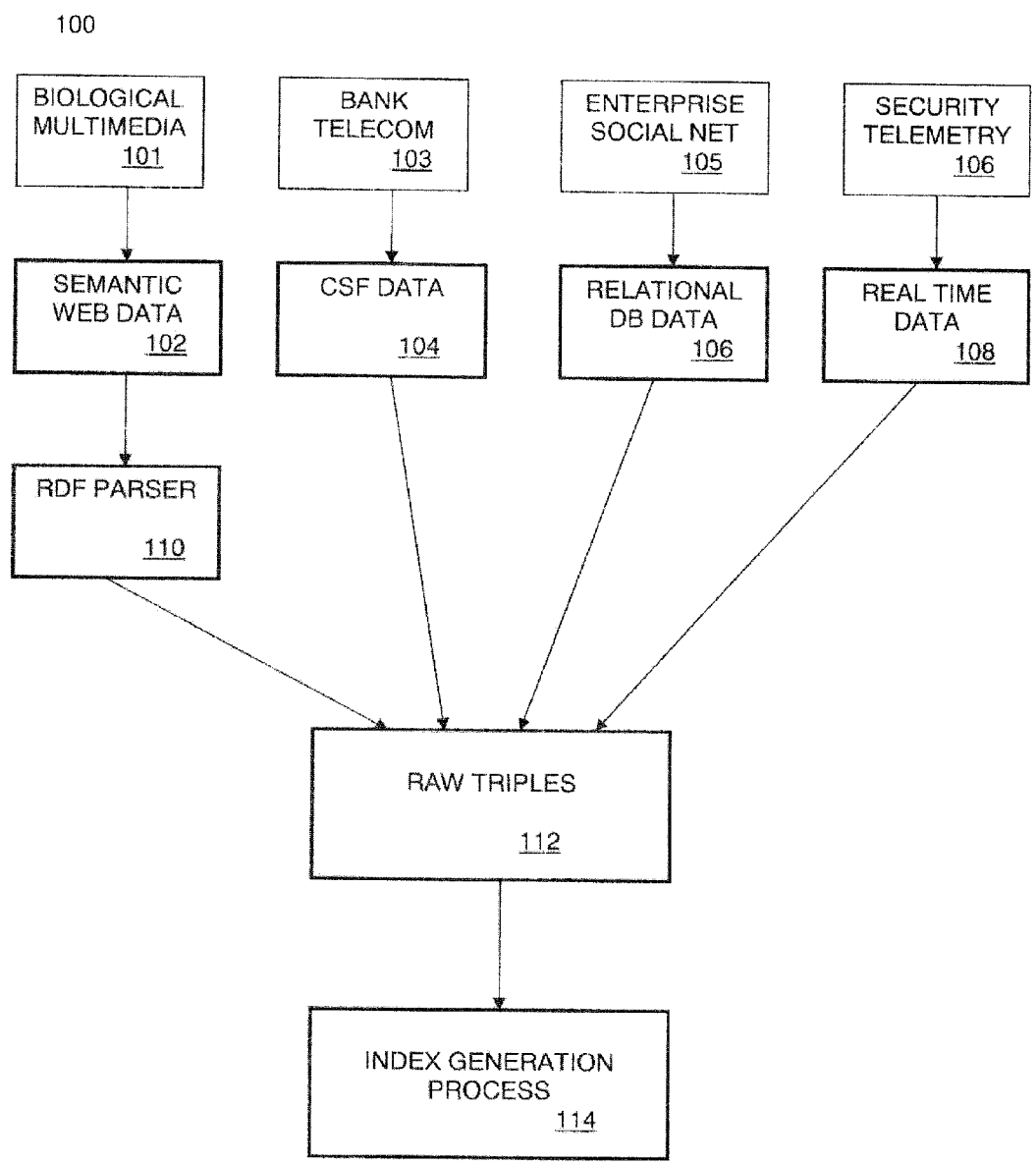
FIG. 1 is a block diagram of a graph database generation process that is configured to work with several types of raw data to produce combinations of sorted and unsorted indices.

Embodiments of a method for creating a graph database which is arranged to store or process data in the form of graph tuples comprising n-parts, are described. In an embodiment, each tuple-part is encoded into a unique part identifier (hereinafter called a UPI), each UPI contains a tag at a fixed position within the UPI. The tag indicates the datatype of the encoded tuple-part. The content data for the tuple-part is encoded in a code that is configured to reflect the ranking or order of the content data, corresponding to each datatype, relative to other tuples in a set of tuples. For content data that comprises a character-string, the code comprises a hashcode; and for content data that comprises or includes a numeric value, the code comprises an immediate value that directly stores the numeric value without encoding. The use of a unique part identifier that includes a tag denoting a datatype for each tuple part, and a code for the content data of the tuple part facilitates the efficient storage of the data; and the use of immediate values to encode the content data facilitates the efficient number-based sorting or organizing of the data. Embodiments of a scalable graph database creation method allows the generation of graph databases and facilitates the use of graph algorithms that find patterns and connections that may often remain hidden in standard relational structures.

In one embodiment, a specific datatype specifies an encoding of geospatial data, which is two-dimensional data elements consisting of coordinates that may have similar or dissimilar ordinate measures. For this embodiment, the data space is decimated into a number of strips of fixed width based on the expected approximate size of a typical search. The two-dimensional data elements are indexed using a UPI that includes a Y-strip number that encodes the strip. For this embodiment, a geospatial UPI is defined for two-dimensional data elements that include a plurality of data points defined by respective pairs of X-ordinates and Y-ordinates. The X-ordinates and Y-ordinates are normalized to a normalized number format, such as unsigned 32-bit integers. The geospatial UPI is arranged with the geospatial type as the most significant field followed in order of significance by the geospatial subtype, Y-strip identifier, normalized X-ordinate, and normalized Y-ordinate. The defined width of each Y-strip corresponds to an anticipated Y dimension of a typical search region of interest. The geospatial UPI thus encodes a plurality of coordinate points in a two-dimensional data space into a single datum that includes the Y-strip identifier respective pairs of an X-ordinate and a Y-ordinate. The use of Y-strips and the construction of a unique part identifier for geospatial data facilitate a search over a two-dimensional region of the data by allowing a search process to linearly scan a limited identifiable region of each of the several strips overlapping the search region of interest.

DETAILED DESCRIPTION

In the following description, numerous specific details are introduced to provide a thorough understanding of, and enabling description for, embodiments of a graph database creation process. One skilled in the relevant art, however, will recognize that these embodiments can be practiced without one or more of the specific details, or with other components, systems, and so on. In other instances, well-known structures or operations are not shown, or are not described in detail, to avoid obscuring aspects of the disclosed embodiments.

The Resource Description Framework (RDF) is a metadata model that provides a general method of modeling information through a variety of syntax formats. The RDF metadata model is based on statements made about resources in the form of subject-predicate-object expressions, called "triples." The subject denotes the resource, and the predicate denotes aspects of the resource and expresses a relationship between the subject and the object. A collection of RDF statements intrinsically represents a labeled, directed pseudo-graph, and as such, it is suited to certain kinds of knowledge representation. In practice, RDF data is often stored in relational database representations sometimes referred to as triple stores or RDF stores.

Triple-Part Processing

Embodiments described herein are directed to graph representations that are called "tuples." As stated previously, a tuple is an ordered list of n-number of parts (strings, terms, objects, or other data units). For purposes of description, embodiments will be described in relation to triples (3-tuple) or triple parts, which are typically the most common representation of tuples. Although embodiments described herein may relate exclusively to triples (3-tuples), it should be noted that such embodiments could apply to tuples of any length. Furthermore, although the term "triple" may imply a representation based on three items, it should be understood that actual computer-based implementations may involve more than three items.

Each triple consists of three or more triple parts that can generally be referred to as the object, attribute, and value. In the semantic web application based on the RDF metadata model, the parts of a triple are typically referred to as the subject (s), predicate (p), object (o). Other parts of the triple (or tuple) can include identifier and optional fields. As an example, a typical set of triples might be as follows:

FRANZ is a company
FRANZ has employee E1
E1 first-name Jans
E1 last-name Aasman
E1 birth-year 1958
E1 lives in P2
P2 is a Region
P2 name Bay Area In the semantic web context, for the first example triple, "FRANZ is a company," the text string "FRANZ" is the subject, the text string "is a" is the predicate, and the text string "company" is the object. In general, the datatypes of a subject, predicate, and object can be virtually any type of object (e.g., string, number, pointer, etc.). In certain contexts there are strict constraints as to allowed data types. For example, in the semantic web application, a triple is constrained as follows: a subject is a valid Uniform Resource Identifier (URI) or a so-called blank or un-named node, a predicate is always a URI, and the object can be a URI, a literal string or a blank-node. Embodiments, are not restricted to graph databases within the frame of the semantic web, but can include graph databases having any triple graph data-structure.

Embodiments of the graph database generation process are configured to take a large number of triple data and generate sorted indices based on the triple parts to facilitate the use of graph algorithms for efficient analysis of the raw data. In general, the initial set of triples, such as the triples shown above starting with "FRANZ is a company" is stored in a transaction log. The transaction log stores the raw triples in a random order or a particular initial sorted order, such as subject-predicate-object. An index of triples represents the same set of triples sorted in a different order, such as predicate-object-subject or object-predicate-subject, and so on.

FIG. 1 is a block diagram of a graph database generation process that is configured to work with several types of raw data to produce combinations of sorted and unsorted indices. As shown in system 100 of FIG. 1 the raw data comprises semantic web data 102, comma separate value (CSV) data 104, relational database (RDB) data 106, and real time data 108. Various types of data sources can be used to generate the corresponding data types 102 to 108. For example, the semantic web data 102 can be generated by sources that produce biological data or multimedia data; the CSV data could be generated by bank processes or telecom applications; the relational database data 106 can comprise enterprise data or data within social networks 105; and the real time date 108 can comprise security or telemetry data 106. This data is processed to generate raw triples 112. An example of a raw triple would be "FRANZ is a company." Some data types automatically generate raw triples 112, others may require certain intermediate processes to generate raw triple data. For example, the semantic web data may require a RDF parser 110 to generate raw triples 112. The raw triples 112 are typically stored in a transaction log in a certain initial or random order. The triples are then processed by index generation process 114, which generates sorted and unsorted indices, where each index contains a complete triple sorted in different ways.

Figure 2:
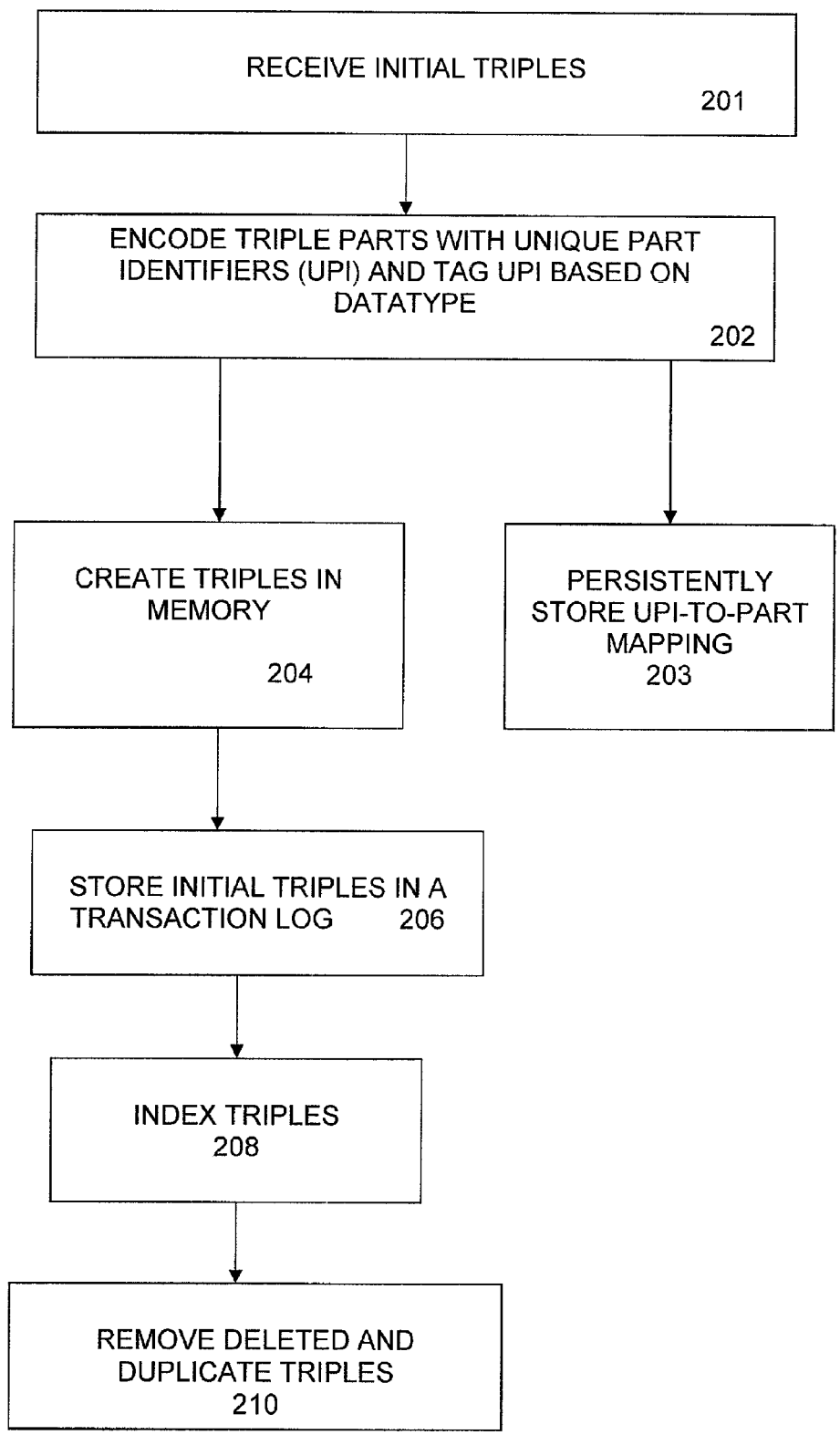
FIG. 2 is a flowchart that illustrates a method of creating a graph database using tagged datatypes, under an embodiment.

The index generation process 114 of FIG. 1 creates tagged datatypes from the raw triples so that all data in a graph database can be sorted in a single table. FIG. 2 is a flowchart that illustrates a method of creating a graph database using tagged datatypes, under an embodiment. In block 201 of FIG. 2, the method starts by receiving the initial (raw) triples 112. As shown in FIG. 1, the raw triples can be generated by various different types of data generating applications in various formats. The triples can be parsed from streamed input, or they can be programmatically created.

A triple basically has a fixed-size structure based on the triple-parts. FIG. 3 illustrates a triple structure under an embodiment. Each triple has a unique part identifier (UPI) and a number of named fields. For the embodiment FIG. 3, table 300 lists the composition and type of each of the named fields 302. The triples under this embodiment comprise a Subject (12 unsigned bytes of type UPI), a Predicate (12 unsigned bytes of type UPI), an Object (12 unsigned bytes of type UPI), and Graph number (12 unsigned bytes of type UPI. The identifier comprises 8 unsigned bytes of type unsigned long integer. In most graph applications the number of predicates is on the order of a few hundreds, or a few thousands. FIG. 3 represents an illustration of a triple representation, and many different variations are possible. For example, both Predicate and Graph number might be pointers to UPIs, instead of full UPIs. Furthermore, the number of bytes for each field can vary, for example from 12 bytes to 16 bytes, or any other appropriate number depending upon system constraints and requirements.

With reference to FIG. 2, in block 202, the raw triples are encoded with unique part identifiers (UPIs). A UPI may be a vector of any length, depending on the relevant scale, such as 12 unsigned bytes or 96 bits. The replacement algorithm that encodes the raw triples with the UPIs may distinguish between various datatypes for input. These include: URIs, blank-nodes, short strings, long strings, characters, integers, positive integers, floats, double floats, reference to triple-id, and any user-defined types. This list is only an example, and is not a complete list of all possible datatypes; for example, users may define new types of datastructures that are desired to be stored.

The UPI comprises a datatype. In one embodiment, a portion of the UPI, for example, the first byte out of the 12-byte octet of the UPI may be used as a tag, and the remainder of the UPI can be used for actual storage. Thus, each UPI may be tagged by dedicating one or more specific bytes as an identifier, as shown in block 202. Following are examples of certain specific datatypes, with illustrative tag and content fields. For a URI datatype, the first byte (byte 1) could be assigned the value of "0" corresponding to a tag, and bytes 2 through 12 could be an 88 bit CRC or any other hash value that guarantees a satisfactory distribution. For blank nodes, the first byte, (byte 1) for the tag could be assigned a value of "1"=1, and bytes 2 through 7 could be a sortable 64-bit number. For short strings, which can be defined as strings where strlen (string)< size of (triple part)–2, the first byte could be assigned a value of "2", the second byte (byte 2) could be coded with the string length, and bytes 3 through 12 could be encoded with the short string in utf8 (8-bit Unicode Transformation Format). For long strings, the first byte (byte 1) could be assigned a value of "3" and bytes 2 through 12 could be could be an 88 bit CRC or any other hash value that guarantees a satisfactory distribution. For positive integers, the first byte (byte 1) could be assigned a value of "4" and bytes 2 through 12 could be a sortable positive integer representation. For numbers or any numerical value, the first byte (byte 1) could be assigned a value of "5" and bytes could be a sortable number representation using 11 bytes. Other datatypes could be tagged and encoded accordingly. That is, different tag numbers could be derived for any desired type of data that may be required.

The process of replacing the triple parts with unique numbers essentially comprises coding the first byte or bytes of the number with the datatype, and then following the first byte (the datatype identifier byte) with an encoded hash value of the string. As an example of an encoded triple part, if the triple comprises the URI: http://www/franz/com/onotologypeople/jans.htm, this URI would be encoded as follows: Byte 1=0, Bytes 2-12=88-bit CRC (cyclic redundancy check) or other hash value. This content data can then be stored in a database in which a first column stores the URI (e.g., 0455958285 . . . 9938) and a second column stores the corresponding data string (e.g., http://www/franz/com/ontologypeople/jans.htm)

As described above, the triple-parts can be URI's or parts or specialized datatypes. Thus, block 202 essentially performs a part-to-UPI mapping operation. This process of encoding the triple parts with UPIs, also referred to as "interning," involves the step of checking to determine whether that particular UPI has been recently encountered. In one embodiment, a clock cache, or similar buffer mechanism is used. A clock cache is a FIFO (First In-First Out) buffer structure that stores a pre-defined number of entries. Alternatively, each UPI can be referenced in an in-memory hashtable to see if it was recently encountered. The size of any internal hashtable that is used to determine the presence of any duplicate part-to-UPI mappings can be set by the user, and can be regularly refreshed.

The part-to-UPI mappings of block 202 are temporarily stored in dynamic memory. If it is determined that the part-to-UPI mapping was not seen before, the mapping (UPI–>part) is persistently stored to non-volatile memory, block 203.

Once the tagged UPIs have been created, the triples are created in memory, block 204. The initial triples are then written to a transaction log, block 206, which may be implemented as a memory-mapped file on 64-bit architectures, or a similar structure on any other type of processor architecture.

Figure 4:
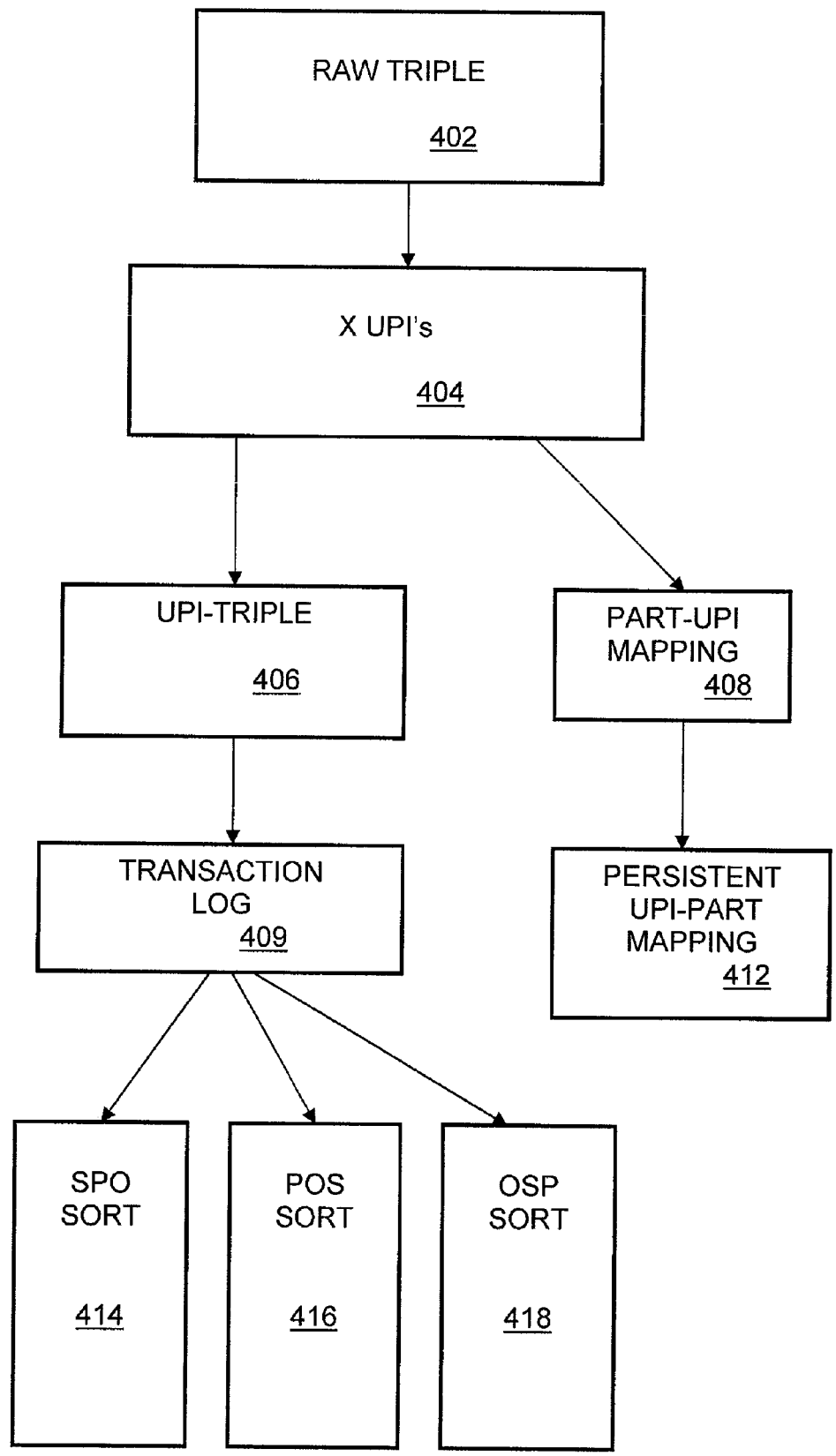
FIG. 4 is a flow-diagram that illustrates a process of generating and storing base triples and a UPI-to-string mapping, under an embodiment.

FIG. 4 is a flow-diagram that illustrates a process of generating and storing raw triples and a UPI-to-string mapping, under an embodiment. As shown in FIG. 4, the raw triples 402 are encoded with X number of UPIs, block 404. The UPIs are organized into encoded UPI encoded triples 406 and part-to-UPI mappings 408. The part-to-UPI mappings are stored in temporary memory and then persistently stored in memory, block 412. The UPI encoded triples are written to a transaction log 409. One or more indexes are then generated from the UPI encoded triples. As shown in FIG. 4, three separate indices are shown, block 414 is an SPO sort based on triple parts, block 416 is a POS sort, and block 418 is an OSP sort.

After the storage of triples in the transaction log, as shown in block 206, a merge-sort indexing process is initiated, as shown in block 208 of FIG. 2 to create multiple indices. Indexing generally comprises the steps of sorting and merging through one or more sorting processes that sort the triples according to a combination of triple-parts. Each sort process creates an index, where each index contains all of the triples from the original transaction log. The relevant sort process starts at or from the position of a tag within the relevant UPI. This produces a graph database in totality, in which the indices are sorted triples.

In one embodiment, the transformation of the transaction log storing all of the triples into multiple indices is performed by a sort process that includes a comparator function. The comparator function may be user-defined. The comparator function compares any two triples based on all of the triple-parts. Different comparator functions compare the triples in different orders. New indices can be created from new triples in new transaction log files. These can be merged into older index files using as the comparator for the merge function the comparator that was used to create the index.

In one embodiment, a user-defined number of triples are read from the transaction log, sorted in a number of ways and then rewritten to intermediary files. In one embodiment, the graph# (g) can be included as a fourth number in the triple. In this case, the following sorts are done: spog (for s, sp, spo queries); posg (for p, po, queries); ospg (for o, so queries); gspo (for g, s, sp, spo queries); gpos (for g, p, po, queries); and gosp (for g, o, so queries). This scheme continues until all triples from the transaction log have been sorted and written to intermediary files. This illustrates one possible set of sorts, and others can also be performed. Moreover, more numbers other than three or four parts may be included in the triple. FIG. 4 illustrates the formation of separately sorted indices using an external merge-sort process based on different predicates. As shown in FIG. 4, the process generates a triple sort for s-p-o-g-id, block 414, and a triple sort for p-o-s-g-id, block 416, among other possible triple sort indices. The use of the UPIs to encode each triple part allows the relative value of the triple within the same datatype to be preserved during the sorting operation.

In one embodiment, for each sort type, all the intermediary files are merged. During the merge process, a secondary index on the primary index is built. This secondary index is also written to file, but always stays in memory. This scheme facilitates the retrieval of triples on the fly. In one embodiment, a function called index-new-triples is used to index all the new triples.

With reference to the merge process of FIG. 2, after indexing, any deleted or duplicate triples are removed, block 210.

In general, the graph database is primarily optimized for monotonic data sets and applications, but the process allows for deletion. One or more specialized bitvectors keep track of which triples are deleted. At merge time any triples marked as "deleted" are removed.

During run-time of each sorting process, the total set of tuples may consist of a first subset comprising sorted tuples, and a second subset comprising unsorted tuples. In this case, a database query may point to the datatype tag, defined by the query, at its fixed position within the UPIs of the sorted tuples, as well as within the UPIs of the unsorted tuples of the second subset. This will result in transparently returning all the tuples requested, independent of their sorting state.

In one embodiment, the triple-parts are represented as multi-byte vectors, as opposed to simple numeric values that require redirection or decoding through dictionaries. That is, if a triple part assignment under present systems was as follows:

S=1, P=2, O=3, G=4, and ID=5 under the tagged datatype scheme, this would become

| S | P | O | G | ID |
|---|---|---|---|---|
| [12 bytes] | [12 bytes] | [12 bytes] | [12 bytes] | [8 bytes] |

In this example, the triple "Jans is a man" would be represented as at least three 12-byte vectors, one for each short literal "Jans" "is a" and "man", with each vector being a totally self-contained representation of the respective literal.

The following phrase provides an illustration of an example phrase and the resulting datatype, under an embodiment. For this example, the triple is "Jans is a man," which is a short literal in which "Jans" is the subject, "man" is the object, and "is a" is the predicate. The resulting tagged datatype for the object "man" in this phrase would then be something like:

"Man"=[3 3 109 97 110 0 0 . . . 0]

where the first byte "3" indicates that the "man" is the object of the triple, the second byte "3" indicates the length of the short literal (in this case "man" has 3 characters), and the remaining bytes are encoded with the short string in utf8, with any trailing unused bytes being "0." The coding to utf8 allows coding straight to the UPI in unicode format without need for a dictionary or similar mechanism. This represents the entire representation of the short literal "man", and is self-contained such that no dictionary lookup would be needed to decode any part of this literal. For instances in which the vector includes an 88-byte CRC value or other hash value, such as long strings, a dictionary lookup would be required to determine the string corresponding to a particular CRC value.

In one embodiment, any number within a triple is encoded as an immediate value. That is, numerical values are directly coded, as is, without any encoding or indirection (e.g., pointer). Thus, for example, if the triple is "Jans birth year is 1958," the year 1958 which is the object in this triple, could be encoded as [3, 4, 1958], where the year "1958" is represented directly as 1958. This coding of numbers as immediates prevents the need for any encoding or indirect reference to any numerical values within a triple. It also preserves the relative hierarchical ranking or sort order relative to other numbers of the same type. Thus, coding a first year as 1958 and a second year as 1960 as immediate values retains the ranking of 1958 relative to 1960 directly in the code itself. The numerical values could be any type of number, such as an integer, floating point number, complex number, and so on; and can represent any type of object, such as a magnitude, rank, date, time, latitude/longitude, and so on. This mechanism greatly facilitates the efficient processing of graphs that contain a high number of numerical values. For example, range queries are greatly enhanced by providing a direct basis of search on the UPI itself when a query such as "give every event between time x and y," or "give every object in this bounded lat/long geographic area." Unlike previous solutions (such as b-trees), the immediate coding of numbers allows for direct searches on the UPI data for range-oriented mappings.

The use of immediate values to code numeric data within a tuple-part allows coding of the tuple-part in a manner that maintains the order (rank) of the content data relative to other tuple parts of the same datatype. Thus, for example, if the raw data comprises a list of people organized (in triples) by name, birthdate, and residence, the name and residence triple parts would be encoded within each UPI as unique hashcodes, and the birthdate triple part would be stored in the each UPI as a direct number. This number represents the order of the person relative to all other people in the list with respect to age. A sort operation can then be readily performed directly on the encoded birthdate data without need for additional table lookup operations. Moreover, queries over ranges of birthdates can be performed without the need for additional processing steps. Thus, the process of encoding each triple part with a unique part identifier and creating indexes that sort the triples based on the triple parts allows the creation of a single graph database that preserves the sort order of the triple for each triple part datatype. The use of immediate values for numbers allows query operations to be performed directly on the sorted triples themselves.

Embodiments of the graph database creation process have been demonstrated to store and retrieve on the order of tens of billions of triples with reasonable size RAM memories. Theoretically ten billion triples can be stored on a 2 GB machine, and this number can scale accordingly based on the higher performance machines. With regard to the range problem, the tagged architecture for UPI as described can perform range queries for both short strings and any type of numerical data. This allows users to work with timestamps and geographical coordinates without requiring concern about any string-to-number mapping. The tagged architecture also allows tuple processors or tuple machines to load triples independently. Separate machines can build up their own number-to-string mapping or write it to a single machine in the network. Triple stores built on separate machines can be merged later into one big triple store. Very large triple stores can be partitioned on different machines and have one big umbrella query engine that knows how to address tuple stores.

Using a method according to embodiments, many datatypes, especially short literals (e.g., numbers, strings in utf8 encoding, timestamps, longitudes, latitudes, etc.) can be sorted and queried by range queries. Another result is that space is saved for short literals, through the elimination of pointers to string-tables. The method also results in faster processing and output, because short literals are self-encoded, thus eliminating the need for references to dictionaries.

Embodiments are particularly suited to distributed processing: tuples can be loaded on different machines, and because of the systematic encoding which is implemented, queries can be performed on different graph databases without any need to convert numbers to strings and vice versa. Through the described method, databases can be advantageously merged. This systematic encoding scheme also facilitates the merging of databases. Tuples can be loaded on different machines, and the systematic encoding facilitates physically merging the different databases into a single database for more efficient processing.

Although specific numeric assignments have been indicated with regard to triple parts, utf8 coding values, and the like, it should be noted that these are provided for example only, and that many different numerical assignments can be made depending upon system constraints, user preference, and other factors.

Semantic Web Embodiment

As shown in FIG. 1, embodiments of the graph database creation process can be directed to producing sorted indices for semantic web data. Semantic networks represent a significant graph-based application that is of the knowledge-based type, and have been developed to expand the capabilities of the World Wide Web by defining meta data for content, such as web pages, multimedia contents, version information, and the like, that allow improved searching and organization capabilities. One example of an application involving semantic networks is the Semantic Web project, which is a project initiated by the World Wide Web Consortium (W3C) to create a universal medium for information exchange by placing documents with computer-processable meaning (semantics) on the web. The semantic web project is basically an attempt to create web content that is understandable by computers and not just humans to improve automated web interactivity.

In one embodiment, a semantic web engine and general graph database creation system utilizes elements of the Resource Description Framework (RDF) and the Web Ontology Language (OWL). RDF is a family of W3G specifications that were originally designed as a metadata model using XML (extensible markup language), but which have come to be used as a general method of modeling knowledge through a variety of syntax formats (XML and non-XML). The RDF metadata model is based upon the idea of making statements about resources in the form of subject-predicate-object expressions, called "triples" in RDF terminology. The subject denotes the resource, and the predicate denotes traits or aspects of the resource and expresses a relationship between the subject and the object. For example, one way to represent the notion "the sky has the color blue" in RDF is as a triple of specially formatted strings: a subject denoting "the sky", a predicate denoting "has the color", and an object denoting "blue". This mechanism for describing resources is a major component in what is proposed by the W3C's Semantic Web activity: an evolutionary stage of the World Wide Web in which automated software can store, exchange, and use machine-readable information distributed throughout the web, in turn enabling users to deal with the information with greater efficiency and certainty. This simple data model and ability to model disparate, abstract concepts has also led to the increasing use of RDF in knowledge management applications unrelated to semantic web activity.

The Web Ontology Language (OWL) is a vocabulary extension of the Resource Description Framework (RDF), and represents the meanings of terms in vocabularies and the relationships between those terms in a way that is suitable for processing by software. OWL is basically a markup language for publishing and sharing data using ontologies on the Internet, and was designed specifically to provide a common way to process the content of web information. Because OWL is written in RDF/XML, OWL information can be easily exchanged between different types of computers using different operating systems, and application languages. One purpose of OWL is to provide standards that provide a framework for asset management, enterprise integration and the sharing and reuse of data on the Web.

Figure 5:
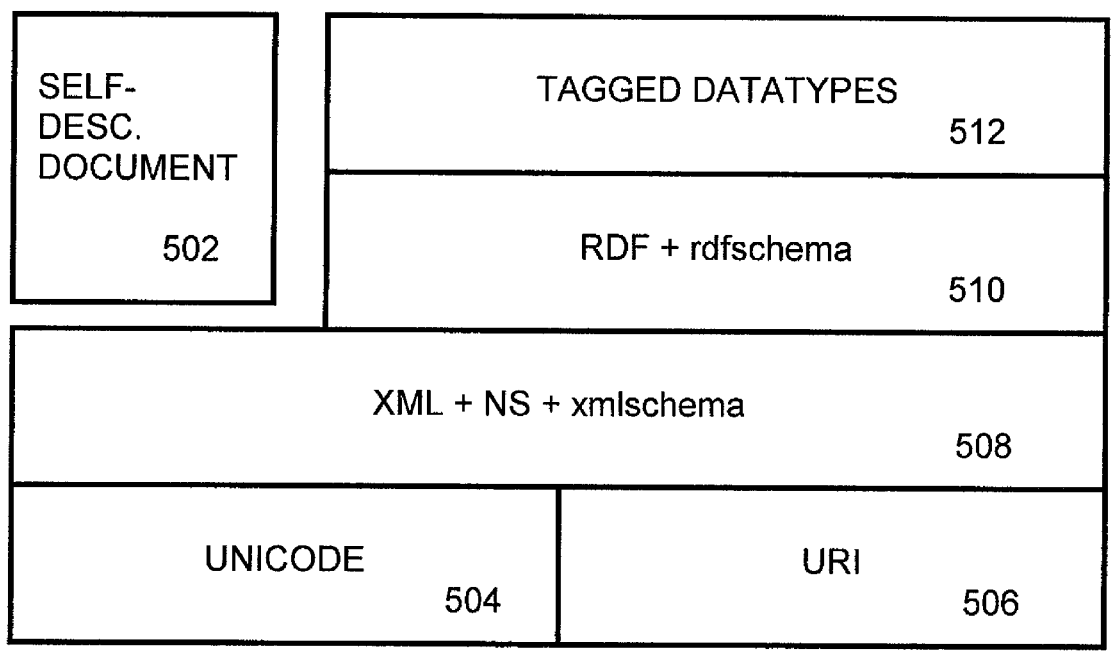
FIG. 5 is a block diagram that illustrates the components of a process to produce raw triples for semantic web data, under an embodiment.

As shown in FIG. 1, the processing of semantic web data 102 to produce raw triples 112 requires an intermediate RDF parser process 110. FIG. 5 is a block diagram that illustrates the components of a process to produce raw triples for semantic web data, under an embodiment. In the embodiment, a portion of the graph database engine comprises an RDF and RDF schema layer 510 built on an XML and XML schema layer 108. As described above, RDF is a simple data model for referring to objects (resources) and how they are related. The RDF schema is a vocabulary for describing properties and classes of RDF resources, with a semantics for generalization-hierarchies of such properties and classes. The XML component of layer 508 provides a surface syntax for structured documents, such as document 502, but imposes no semantic constraints on the meaning of these documents. The XML schema is a language for restricting the structure and content elements of XML documents. The XML layer 508 is built on unicode 504 and URI 506 layers. In the context of the semantic web, the URI's identify resources on the web using the RDF description of these resources. In one embodiment, components 504 to 510 comprise a RDF parser 110 that produce raw triples 112 that are used to produce tagged datatypes 512.

Figure 7:
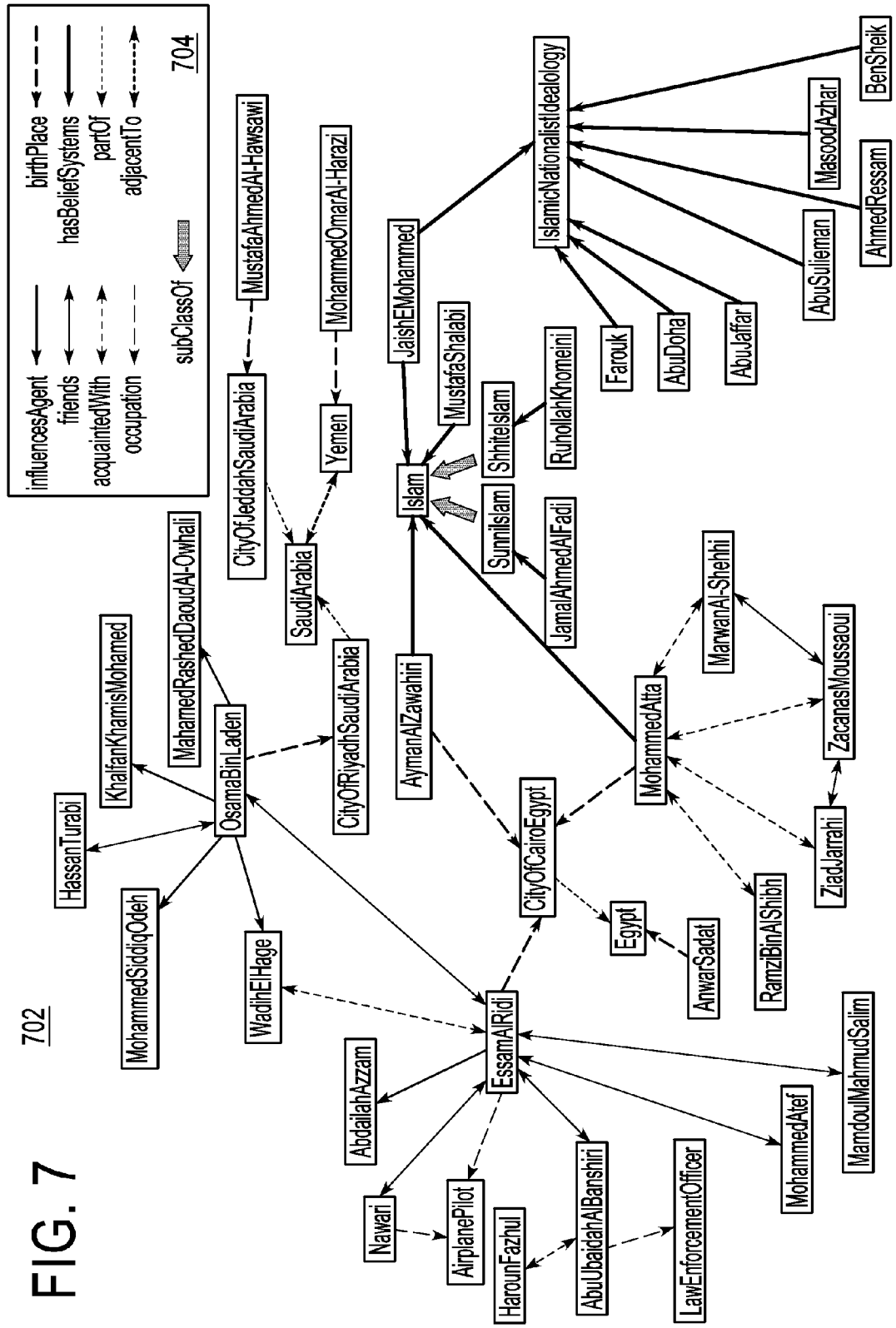
FIG. 7 is an example of a graph database for the triple data of FIG. 6, under an embodiment.

According to embodiments, a graph database engine creates scalable graph databases using RDF and OWL methodologies, as well as other methodologies. In general, there are many different types of possible graph representations, such as multidimensional arrays, or linked symbols. FIG. 6 is an example of triple structures comprising OWL and RDF classes that can be used with embodiments of a scalable graph database creation process; and FIG. 7 is an example of a graph database for the triple data of FIG. 6, under an embodiment. FIGS. 6 and 7 are provided for illustration only and show the creation of a graph database 702 from raw triple data 602 for certain persons in an organization. The graph database 702 displays the relevant people and the relationships among them through relation indicators shown in legend 704.

Embodiments can be directed to semantic web engines or scalable graph databases for social network analysis, or any other type of graph data for various applications.

Two-Dimensional Data Elements

In one embodiment, the graph database generation process includes a mechanism for the efficient storage and retrieval of two-dimensional data elements. Such data elements may be referred to as "geospatial," and it should be understood that this term includes location data for positions on or around the earth's surface, as well as any other two-dimensional location, such as on a flat plane, or any other two-dimensional geometry system. For purposes of this description, the term "coordinate" refers to a data element in a set of two-dimensional data. Thus, each geospatial datum in a set of two-dimensional data will be a coordinate, that is, a duple of two linear ordinates that define a point in a two-dimensional geometric system. A coordinate can be a pair of similar ordinates, such as X and Y on a plane (e.g., geographic location data). A coordinate, however, is not strictly required to be a pair of similar ordinates, but instead the two ordinates can be any two monotonic measures of possibly dissimilar values. For example, a two-dimensional set may be a plot of temperature vs. time-of-day. Thus, the term "two-dimensional data elements" may refer to coordinates with either similar or dissimilar ordinate measures.

Figure 8:
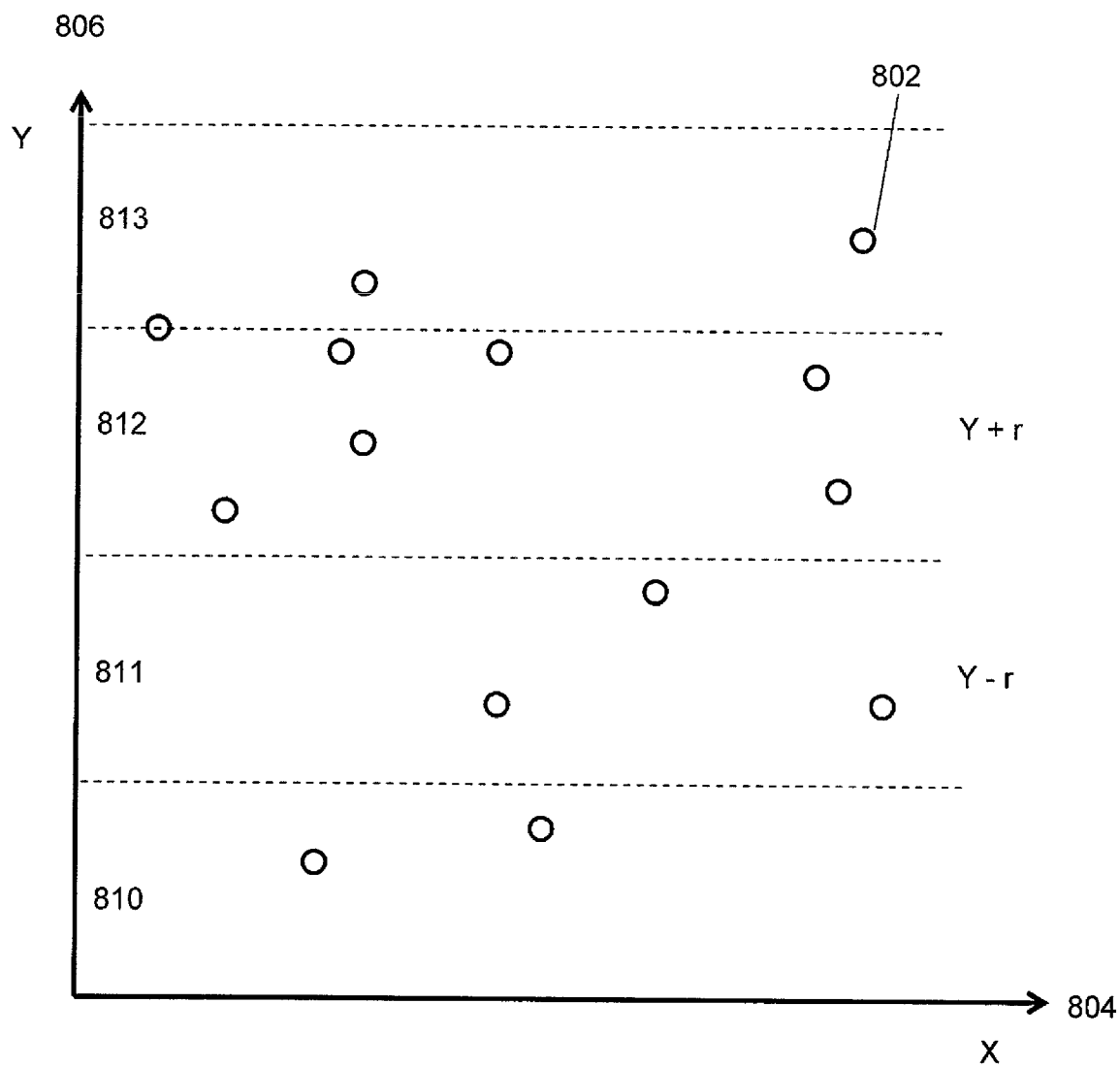
FIG. 8 illustrates the division of a geospatial coordinate space into a number of strips, under an embodiment.

In one embodiment, the geospatial coordinate space is divided into a number of uniform strips to conveniently partition the entire space, and a geospatial UPI type incorporating each strip is defined. The area is divided using the appropriate dimensions, such as Cartesian or spherical dimensions, depending on the coordinate space being mapped. FIG. 8 illustrates the division of a geospatial coordinate space into a number of strips, under an embodiment. As shown in FIG. 8, a number of points 802 are shown in a two-dimensional space defined by X-axis 804 and Y-axis 806. The coordinate space is divided into a number of strips 810-812. Each strip is of width Y−r, Y+r, where r represents the approximate typical search radius that is expected to be used on the data. Thus, the dimensions of the strips are typically selected on expected search criteria and further modified based on system constraints and requirements. For example, practical processing limitations may impose a processing limit on the number of strips to a 16-bit integer. In this case, the entire surface of the earth could be divided into strips about 0.2 miles wide. For some searches, this degree of resolution is fine, but for many searches, such as for people or vehicles, the search radius for this strip size may be too large. For example, for geographical data using a smaller range of earth latitude, the 16-bit integer strip number can be distributed over the smaller range, giving a proportionately finer strip resolution. The search radius and strip size generally scale to the entire search plane for geographical data, and the entire data set size for other types of data. Thus, if the surface to be mapped is a semiconductor chip of one square centimeter, the strips could be on the order of one nanometer wide, for 16-bit integer processing.

In one embodiment, all of the strips 810-812 are of the same width, as defined by the search radius, r. Alternatively, the strips may be of different widths, depending on certain search parameters and system capabilities.

The use of strips to divide the data space allows the use of efficient sorting of the two-dimensional data elements through a "strip-sorting" method. In one embodiment, the strip-sorting method utilizes a UPI that includes the X and Y data values as well as a specific Y strip that defines a subset of the data space. This allows two-dimensional data elements, for which both ordinates may be sorted, to be stored in a single linear index. This facilitates single linear sort operations for two-dimensional space.

Figure 9:
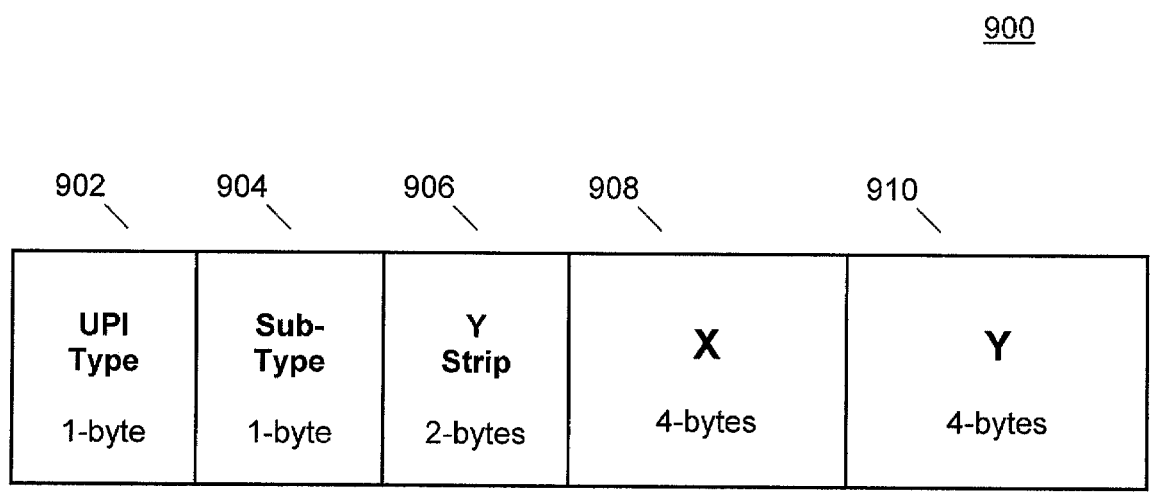
FIG. 9 illustrates the structure of a UPI for geospatial data elements, under an embodiment.

FIG. 9 illustrates the structure of a UPI for geospatial data elements, under an embodiment. For the embodiment of FIG. 9, the geospatial UPI 900 supports up to 256 subtype codes, which subtypes can either be predefined or user-defined. A geospatial UPI encodes both an X and Y ordinate inside a single UPI in a manner that allows efficient linear searching. A one-byte UPI field 902 is used to identify the encoded UPI as a geospatial UPI, and the subtype field 904 controls how each external numeric ordinate (e.g., degrees, radians, meters, etc.) is converted to and from the geospatial UPI internal representation.

In one embodiment, the geospatial UPI is used in an RDF (Resource Description Framework) metadata model in which statements about resources are made in the form of subject-predicate-object expressions, or "triples". The subject denotes the resource, and the predicate denotes traits or aspects of the resource and expresses a relationship between the subject and the object. To search a triple store for geospatial UPIs that are close to a certain XY coordinate (i.e., within a bounding box [X1, Y1, X2, Y2]) using a traditional RDF store would require separate triples for both the X and Y values. Within any range of X1 to X2, every Y value would need to be retrieved and range tested. As the size of the data increases, the density of UPIs within the X range [X1, X2] increases, thus introduces scaling problems. In one embodiment, the use of the Y-strip field 906 allows the UPIs in any of the SPOG indices to be sorted as 12-byte unsigned integers.

Within any index, all geospatial UPIs of a given subtype will sort together, then sorted on the Y-strip, then on the unsigned 32-bit integer X, then on the unsigned 32-bit integer Y The Y-strip is a decimation of the Y value, in that the Y values are divided into narrow strips. UPIs within a given subtype are sorted first on the strip, then the X ordinate, and then on the Y ordinate.

The size of the fields illustrated in FIG. 9 results in a UPI that is 96-bits (8-bytes) wide to conform to specific system requirements. It should be noted, however, that the size of the fields and the overall geospatial UPI can be varied depending upon system requirements and constraints, and that many different sizes for the fields are possible.

As shown in FIG. 9, the geospatial UPI uses three fields to store information about the two-dimensional data. The Y-strip field 906 represents the most-significant bits of the data structure, while the Y-data field 910 represents the least-significant bits. Through UPI structure 900, the Y-strip field is used to limit the number of data points to examine based on the Y value. The UPI structure of FIG. 9 is directed to an embodiment in which a Y-strip number is followed by X value and Y value. In an alternative embodiment, the UPI could be organized such that an X-strip number if followed by Y value then X value.

In one embodiment, the width of the strip is dictated by the user, and is thus selected by the designer or creator of the data store. For most efficient searching, the strip width should be chosen to be within an order of magnitude of the search size (radius r). As an example, consider a large number of GPS latitude and longitude data elements of cell phone locations. Such data may have a resolution of about ten meters. If the search area encompasses a radius of 100 meters, and the latitude-longitude UPIs use a strip width of 100 meters, then to find all candidates within the bounding box [X−100, Y−100, X+100, Y+100] requires scanning short regions of two strips. Each candidate within those regions can be further filtered for exact radial distance from the target X and Y. In this case, the proportion of entries that must be filtered out is $(1-(\pi/4))$. If the strips are larger, say on the order of 500 meters, the 100 meter radius search needs to scan at most only two strips, and frequently only one strip. In this case, however, the overall scan is somewhat less efficient because the number of entries that must be filtered is greater. Even if the Y region lies completely within a single strip, the scan must filter approximately $(5-(\pi/4))$. If the Y region of interest spans two strips, the proportion of entries that must be examined and rejected by the filter is $(10-(\pi/4))$. If the strips are made significantly smaller than the typical search radius, the proportion of entries that must be examined and filtered is not necessarily affected, but the number of Y-strips that must be scanned over the range [X1, X2] increases, causing more cursor creation and scans of disjoint sections of the index file. For example, if the strip width were 10 meters, the 100-meter radius query would need to examine ten or eleven strips. This requires more cursor initialization and seeks over the indexes.

In practice, however, even if the strip size for a particular geospatial subtype is even greater than an order of magnitude away from the Y range of a particular search, for very large databases, the strip approach is still much more efficient that a direct X-Y search. If it is anticipated that data will be searched using widely different ranges at different times, then the data can be duplicated in the database using multiple subtypes with different strip sizes. For example, if it is desired at certain times to find cell phone records within 100 meters of a location, and other times to find cell phone records within 10 kilometers of the location, then the data can be recorded with multiple triples with subtype strip width optimized for each of the expected types of searches.

As shown in FIG. 9, the geospatial UPI type can support up to 256 subtype codes based on the 1-byte sub-type field 904. This can be used during the creation of a database to define different types of X and Y data, or different degrees of precision for any type of data. For example, one sub-type may be defined for latitude and longitude data with strips of 1-degree width, while another sub-type may be defined for latitude and longitude data with strips of 10-mile width, and so on. The subtypes may be predefined or available for the application programmer to custom design.

Figure 10:
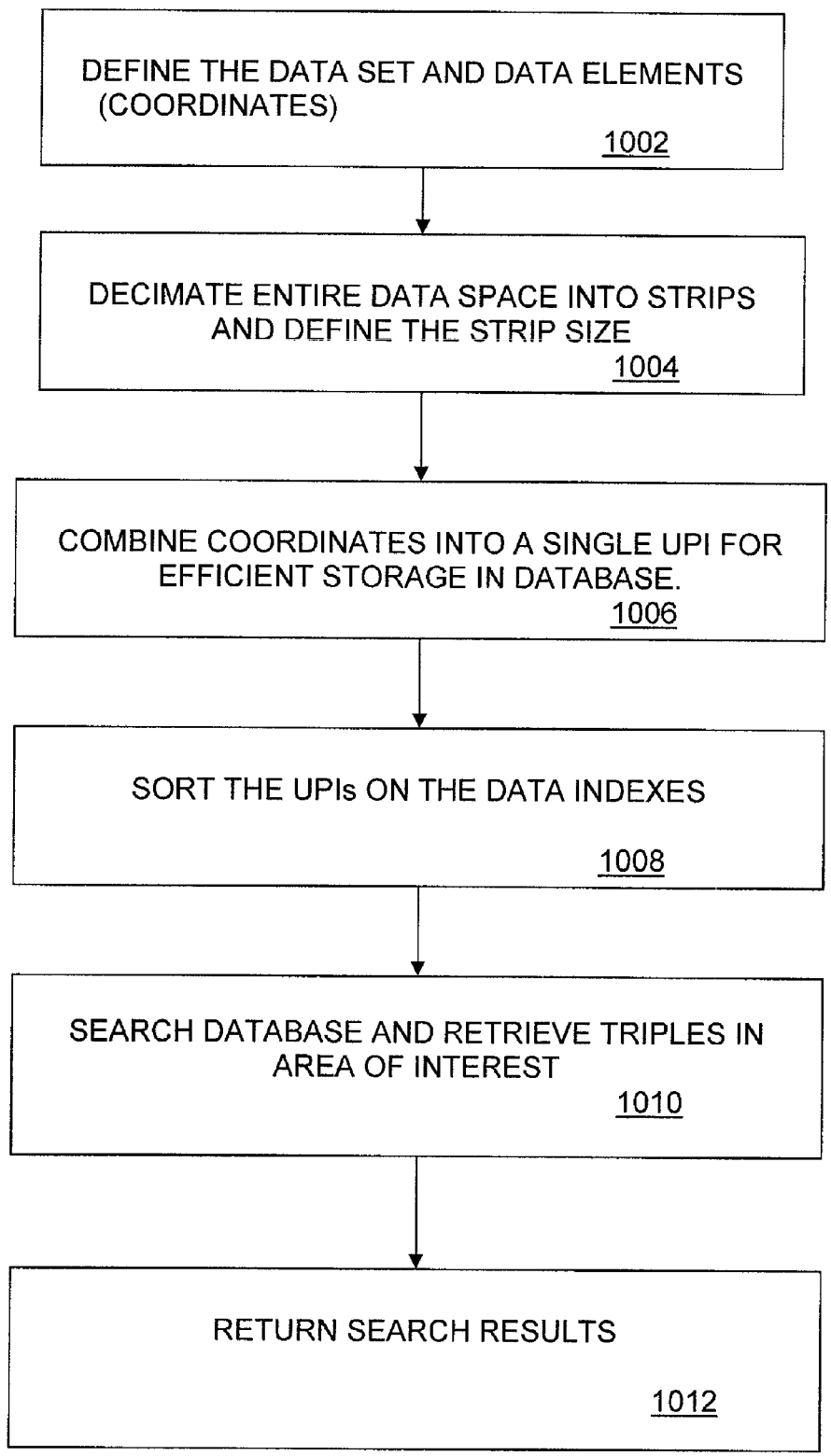
FIG. 10 is a flowchart that illustrates a method of processing indexing two-dimensional data, under an embodiment.

FIG. 10 is a flowchart that illustrates a method of processing indexing two-dimensional data, under an embodiment. The overall process involves finding all triples (geospatial UPIs) within a data store that are close (within a defined range) to a certain location (XY coordinate) through the general process steps of creating or populating a database with geospatial UPI's, sorting the UPI data, and then querying the database to find UPI's in the region or regions of interest. These basic steps may be performed at different times and by different entities or facilities. As shown in block 1002, an overall data set and the constituent data elements (coordinates) are defined. This typically involves populating a searchable database with appropriate X and Y values. The X and Y values can be any type of data, such as location, time duration or range information, or any similar data. The entire data space containing the data elements is then decimated into a number of strips, and the strip size is defined, block 1004. This decimation process divides the data space into a number of uniform strips, and facilitates efficient searching within the database. The strip size is determined by the user based on the search size, and for optimum results should be within an order of magnitude of the search size. In block 1006, the X and Y coordinate values and strip information are combined into a single UPI and these are stored in the database. The use of a single UPI greatly enhances efficient storage of the geospatial data and subsequent search operations on the database. In block 1008, the UPIs are sorted on the several possible data indexes. The database can then be searched to find any or all triples in an area of interest, block 1010. During a search operation in response to a user query, the process examines all triples in an area of interest defined by the strips. The search results, which may be one or more found triples, or no triples, are then returned to the user, block 1012.

Figure 11:
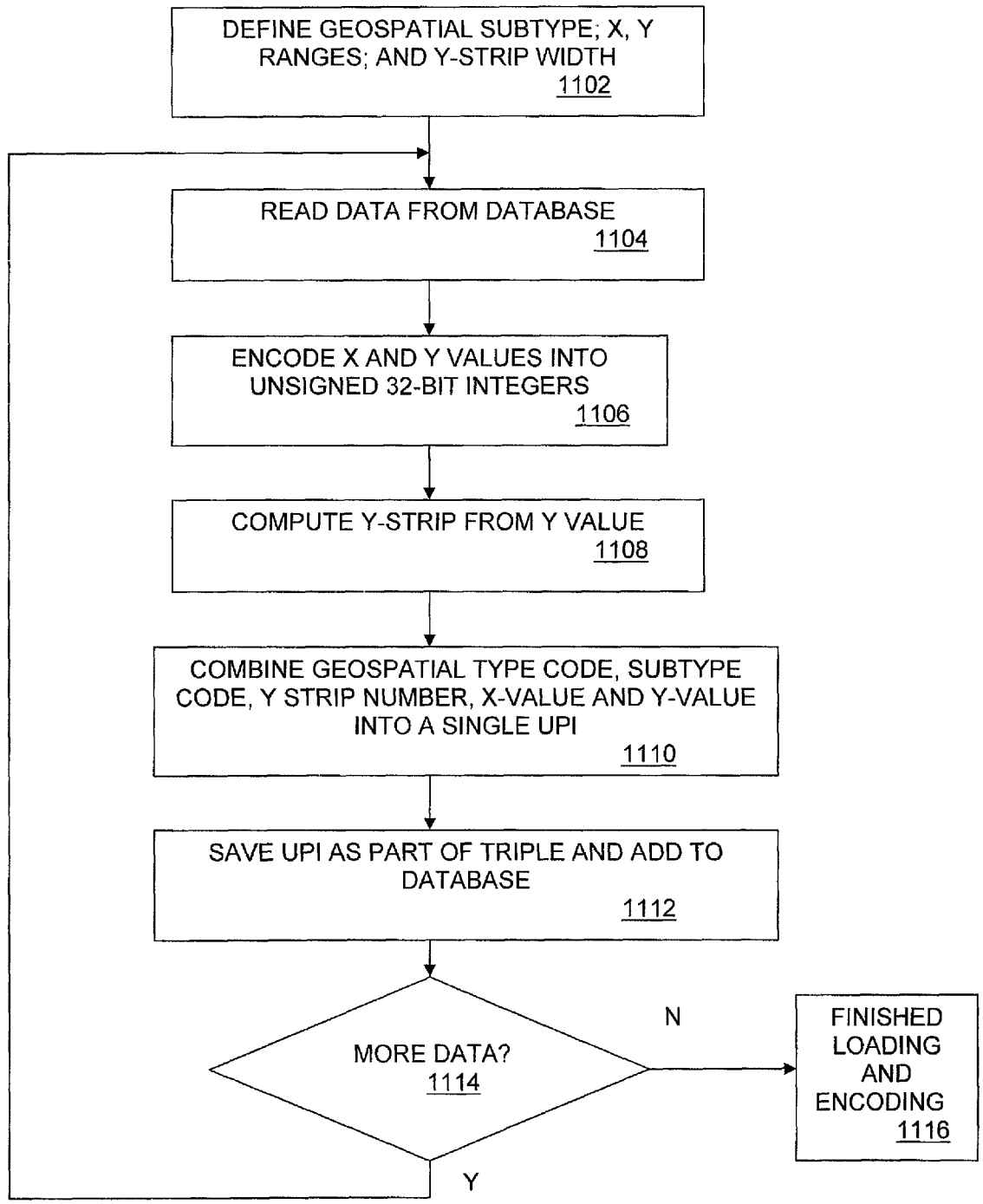
FIG. 11 is a flowchart that illustrates a method loading geospatial data into a database, under an embodiment.

As illustrated in FIG. 10, the overall process comprises several major sub-processes including database creation, data sorting, and database searching. FIG. 11 is a flowchart that illustrates a method loading geospatial data into a database, under an embodiment. In block 1102, the geospatial subtype is defined. The X and Y ranges are specified, along with the geospatial subtype and Y-strip width. The Y-strip width represents the expected search region extent along the Y axis. In block 1104, the process connects to the data store (triple store database), then reads and loads the data one entry at a time. Data can be sourced from a single source or from multiple sources. Each entry in the database comprises geospatial datum. In block 1106, the X and Y values for the data entry are scaled into unsigned 32-bit integers. The Y-strip is then computed from the Y value, block 1108. The geospatial type code, subtype code, Y strip number, and X and Y values are then combined into a single geospatial UPI, block 1110. In one embodiment, the geospatial UPI is encoded with the 32-bit integer X and Y values, the 16-bit strip number, and the 8-bit subtype. Different subtypes can be defined for different types of X and Y data, as well as for different strip sizes. As shown in FIG. 9, a one-byte UPI field 902 is used to identify the encoded UPI as a geospatial UPI for systems in which different types of UPIs are processed. This UPI is used to facilitate the search of the database for geospatial UPIs that are close to a particular region of interest, such as within a given bounding box or radius around a certain X and Y point. The geospatial UPI is then saved as part of the triple and is added to the database. This process continues for all relevant entries in the database, thus in block 1114 it is determined whether there are more data entries to encode. If more data elements exist, the process proceeds from block 1104, otherwise the loading and encoding process ends with block 1116, at which point the encoded UPI triple store is complete.

In one embodiment, each triple in the triple is created with the geospatial UPI as the object part. An example triple structure in Subject-Predicate-Object (spo) form may look like <Retail_Store_628><isLocatedAt><+37.8036-122.275>. Once all the data is added to the triple store, the process sorts the several data indexes, as described in the description above. The 96-bit geospatial UPI is sorted as a simple 96-bit unsigned binary integer, like any other UPI.

Figure 12:
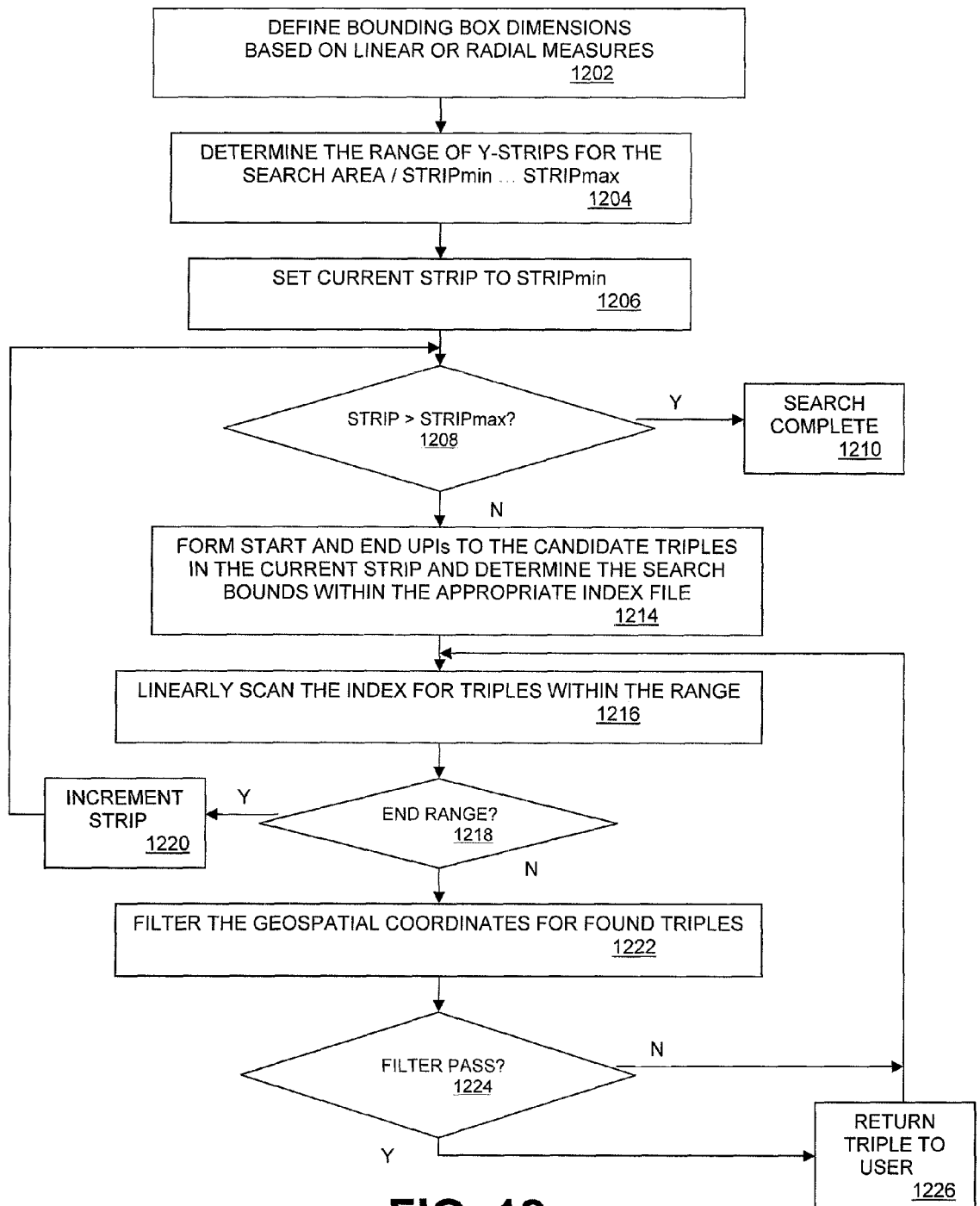
FIG. 12 is a flowchart that illustrates a method searching a database containing geospatial data, under an embodiment.

Once the database of geospatial UPIs that include the Y-strip information is complete, and the UPIs have been sorted, it can be queried and searched to find triples that are within an area of interest. FIG. 12 is a flowchart that illustrates a method searching a database containing geospatial data, under an embodiment. In block 1202, the boundaries (bounding box) of the area of interest are defined. If the search is conducted within a bounding box, the boundaries are the rectangle defined by the minimum and maximum X, minimum and maximum Y values, that is: Xmin, Xmax, Ymin, Ymax. If the area of interest is defined as a radius around a given point, the bounding box is given by:

Xmin=X−radius

Xmax=X+radius

Ymin=Y−radius

Ymax=Y+radius

Once the bounding box for either linear or radial measurements has been defined in block 1202, the process determines the range of Y strips that must be searched in block 1204. The strip width was determined when the data was loaded, as shown in FIG. 11. This step 1204 determines the strip, STRIPmin in which the Ymin value falls, and the strip, STRIPmax in which the Ymax value falls. The search process proceeds strip by strip for as many strips are necessary for the region of interest. Thus, in block 1206, the current strip value is set to STRIPmin, and in block 1208, it is determined whether the last strip has been reached, i.e., whether current strip is greater than STRIPmax. If it is, the search process is complete, block 1210. If not, then for the current strip, the process proceeds with block 1214, in which the start and end UPIs are formed to the candidate triples within the current strip. For the UPI structure illustrated in FIG. 9, the start and end UPIs are formed within a particular strip as follows, with the most significant byte first:

startupi=[geo][subtype][strip][Xmin][x00000000]

endupi=[geo][subtype][strip][Xmax][xFFFFFFFF]

The process also determines the search bounds within the appropriate index file, which are the locations of the startupi and endupi values within the index.

These initial process steps basically identify the region of interest and determine minimum and maximum strip numbers that overlap the region. For each strip, the process forms a UPI with the minimum X and minimum Y values, and starts processing until the maximum X and maximum Y values for that strip number and subtype are reached. In block 1216, the process linearly scans the index for triples within the range Xmin to Xmax by retrieving triples from the startupi to the endupi. In block 1218 it is determined whether the endupi is reached. If so, the strip is incremented, block 1220, and the next strip is processed from block 1208. If endupi is not reached, as determined in block 1218, the process filters the geospatial coordinates, block 1222. In general, the strip boundaries will not be concurrent with the region of interest, and therefore triples may be included within a strip but not within the region of interest. The filtering step determines whether each found triple is within the area of interest. If, in block 1224 it is determined that the found triple is within the area of interest, the triple is returned to the searching user, block 1226. The process then proceeds to process the next potential found triple from block 1216. If, in block 1224 it is determined that the found triple does not pass the filter and is outside the area of interest, the process proceeds directly from block 1216 to find the next potential triple.

The filtering step of 1222 is dependent upon the type of coordinate being processed. For searches within a linear bounding box, the Y ordinates outside of Ymin and Ymax are filtered out. This is necessary only if the current strip is the first or last strip. For radial coordinates, the search involves defining the bounding box in which the circle inscribed and filtering the triples within the Cartesian or Spherical regions. For a search within a Cartesian radius, the Pythagorean distance is compared to the search radius, to determine whether the triple is inside or outside of the strip. For a search within a Spherical radius, the Haversine distance is compared to the search radius.

The process of FIG. 12 eventually loops over all strips that contain the area of interest to return any triples in the area of interest to the user until the search is complete, block 1210.

As described above, various different dimensions can be used to define the region of interest. In one embodiment, additional processes can be provided to encode and decode the X and Y values to and from the geospatial UPIs. For example, macros can be provided to define geospatial subtypes for a region on a flat Cartesian plane and for the surface of a sphere (as for latitude/longitude), which can be in either decimal degrees or radians.

An additional process may be provided to accommodate polygon regions, and can be used to determine if a pair of geospatial ordinates lies within a region defined by a polygon. For this process, a list of X and Y ordinates are specified as the vertices of the polygon, and successive vertices define the edges with an implied edge between the last and first element. Storing a polygon in a triple store involves using an ordered set of triples, one for each vertex. The subject (s) is any convenient identifier for the polygon, the object (o) is a geospatial UPI for the vertex, and the graph (g) is available for any other purpose. The predicate (p) is a non-negative integer UPI of a special datatype +subscript+ that is used to impose order upon the set of vertices.

Once the ordered set of vertexes is extracted from the database, whether any particular coordinate point lies inside or outside the polygon can be determined with familiar techniques from computer graphics.

Embodiments described herein are directed to a method of facilitating a search over a two dimensional region of the data by allowing a search process to linearly scan a limited identifiable region of each of the several strips overlapping the search region of interest by: defining a geospatial datatype for encoding a plurality of coordinate points in a two-dimensional data space into a single datum that includes respective pairs of an X-ordinate and a Y-ordinate; dividing the two-dimensional data space into a plurality of uniform Y strips, each of a defined width; converting the X-ordinates and Y-ordinates to a normalized number format; defining a data structure for the datum comprising a strip number followed by X-ordinate data followed by Y-ordinate data for each strip of the plurality of Y strips; defining a sub-type based on the X-ordinate data, Y-ordinate data and the defined width of a Y strip; and encoding the sub-type in the data structure, wherein the component fields of the data structure are arranged so that the datum can be sorted linearly as a single unsigned integer. The defined width of the Y-strip corresponds to an anticipated Y dimension of a typical search region of interest The X-ordinates and Y-ordinates comprise geospatial data, such as location data in which the X-ordinates and Y-ordinates have similar ordinate measures. Alternatively, the X-ordinates and Y-ordinates may have dissimilar measures. The data structure comprises a unique part identifier for use in a triple store, and as part of a graph database creation system.

Aspects of the graph database creation system utilizing geospatial UPIs may be provided by various programs or processing units. These may be embodied in various different circuits, components, or systems, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects of the process include: microcontrollers with memory (such as EEPROM), embedded microprocessors, firmware, software, etc. Furthermore, aspects of the described method may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the graph database creation process is not intended to be exhaustive or to limit the embodiments to the precise form or instructions disclosed. While specific embodiments of, and examples are described herein for illustrative purposes, various equivalent modifications are possible within the scope of the described embodiments, as those skilled in the relevant art will recognize.

The elements and acts of the various embodiments described above can be combined to provide further embodiments. These and other changes can be made to the graph database creation process in light of the above detailed description.

In general, in the following claims, the terms used should not be construed to limit the described system to the specific embodiments disclosed in the specification and the claims, but should be construed to include all operations or processes that operate under the claims. Accordingly, the described system is not limited by the disclosure, but instead the scope of the recited method is to be determined entirely by the claims.

While certain aspects of the disclosed method and system are presented below in certain claim forms, the inventor contemplates the various aspects of the methodology in any number of claim forms. For example, while only one aspect of the described process may be recited as embodied in machine-readable medium, other aspects may likewise be embodied in machine-readable medium. Accordingly, the inventors reserve the right to add additional claims after filing the application to pursue such additional claim forms for other aspects of the described method and system.

What is claimed is:

1. A computer-implemented method executed in a processor-based computing system comprising one or more processing units coupled to a data store maintaining a database, the method comprising:

defining, in a processing unit of the one or more processing units acting on data stored in the database a geospatial datatype for encoding a plurality of coordinate points in a two-dimensional data space into a single datum that includes respective pairs of an X-ordinate and a Y-ordinate;

dividing the two-dimensional data space into a plurality of Y strips in order to partition the two-dimensional data space to facilitate sorting of the two-dimensional data through a strip sorting process, wherein each strip is of a defined Y-strip width based on a search radius that is expected to be used on the data;

defining a Y-strip field that encodes a limit on the number of data points to examine based on the Y-ordinate value;

defining a unique part identifier (UPI) data structure for the datum comprising a Y-strip field followed by X-ordinate data followed by Y-ordinate data for each strip of the plurality of Y strips; and converting the X-ordinates and Y-ordinates to a normalized number format, wherein the UPI data structure is arranged with the geospatial datatype as the most significant field followed in order of significance by the geospatial subtype, Y-strip identifier, normalized X-ordinate, and normalized Y-ordinate, wherein the component fields of the UPI data structure are arranged so that the datum can be sorted linearly as a single unsigned integer, and wherein the UPI data structure is configured for use in a triple store, and wherein the UPI is used in a resource description framework (RDF) metadata model in which statements about resources are made on the form of subject-predicate-object (SPO) expressions.

2. The method of claim 1, wherein Y-strip width is selected to be within an order of magnitude of the search radius.

3. The method of claim 1 wherein the X-ordinates and Y-ordinates comprise geospatial data in which the X-ordinates and Y-ordinates have similar ordinate measures, or the X-ordinates and Y-ordinates have dissimilar measures.

4. The method of claim 3 wherein the geospatial data comprises geographic location data, and wherein each geospatial datum consists of one spherical coordinate or one Cartesian coordinate.

5. The method of claim 4 further comprising defining a sub-type based on the X-ordinate data, Y-ordinate data and the defined width of a Y strip, and encoding the sub-type in the UPI data structure.

6. The method of claim 5, wherein the unique part identifier comprises at least one part of a triple that includes at least three parts.

7. The method of claim 6, wherein the unique part identifier facilitates a search over a two dimensional region of the data by allowing a search process to linearly scan a limited identifiable region of each of the several strips overlapping the search region of interest.

8. The method of claim 7 wherein each part of the triple is encoded with a unique part identifier, the unique part identifier comprising a tag that identifies a datatype for the part, and a code that encodes the data content for the part, wherein the code preserves a relative ranking of the data content for the corresponding datatype within a plurality of triples.

9. The method of claim 8, further comprising storing the tag in a fixed field of the unique part identifier, and wherein the tag comprises a datatype identifier.

10. The method of claim 9 further comprising:

storing each of the plurality of triples in a transaction log; and sorting each of the plurality of triples based on a part of each triple to create a number of indices, each index of which comprises the plurality of triples sorted according to a particular ordering of the component parts.

11. The method of claim 10 wherein the triples are provided by a data source selected from the group consisting of semantic web data, comma-separated value data, relational database data, and real-time data.

* * * * *